Patented Apr. 21, 1925.

1,534,351

UNITED STATES PATENT OFFICE.

WILHELM BAUER AND ALFRED HERRE, OF OPLADEN, NEAR COLOGNE, GERMANY, ASSIGNORS TO FARBENFABRIKEN VORM. FRIEDR. BAYER AND CO., OF LEVERKUSEN, NEAR COLOGNE-ON-THE-RHINE, GERMANY.

VAT DYE.

No Drawing.   Application filed May 19, 1923.   Serial No. 640,225.

*To all whom it may concern:*

Be it known that we, WILHELM BAUER and ALFRED HERRE, citizens of Germany, residing at Opladen, near Cologne, in the State of Prussia, Germany, have invented new and useful Improvements in Vat Dyes, of which the following is a specification.

Our invention relates to the manufacture and production of new and valuable vat dyestuffs. They are obtained by treating with sulfurylchlorid the dyestuffs which can be obtained by condensing beta-naphthisatin derivatives in which the oxygen of the alpha-keto group is replaced by easily moveable or replaceable substituents, e. g. halogen, sulfur, the animo group, the alkoxy group with 1-anthrol or their derivatives having a free ortho- and para-position to the hydroxy group. By this treatment with sulfurylchlorid the chlorine enters into the anthrol nucleus.

The new dyestuffs are after being dried dark blue crystalline powders soluble in hot nitrobenzene generally with a blue coloration; and which yield with hydrosulfite and caustic soda solution generally orange-yellow vats dyeing cotton after exposure to air bluish-grey to black shades. These shades are bluer, deeper and faster to boiling and to light as those obtained with the original dyes not treated with sulfurylchlorid.

In order to illustrate the new process more fully the following example is given, the parts being by weight:—

37, 3 parts of the dye obtained from beta-naphthisatin-alpha-chloride and 1-anthrol (see United States Letters Patent No. 1.005.141) are suspended in 500 parts of chlorobenzene and 14 parts of sulfurylchlorid are added to the suspension which is cooled and stirred. After the addition of the sulfurylchlorid the temperature of the mixture is raised to 70° C. The chlorination now takes place, which is accompanied by an evolution of sulfurous acid and hydrochloric acid. After the reaction is complete it is allowed to cool, and the dye is filtered off and dried. It is a bluish-black crystalline powder soluble in concentrated sulfuric acid with a slate blue coloration. It forms an orange-brown vat with caustic soda solution and hydrosulfite which dyes the textile fibre deep blue-black shades.

We claim:—

The herein described new dyestuff containing a beta-naphthisatin nucleus combined with a chlorinated 1-anthrol nucleus, which dye is a bluish-black powder soluble in concentrated sulfuric acid with a slate blue coloration; yielding an orange-brown vat with caustic soda solution and hydrosulfite which dyes the textile fibre deep blue-black shades, substantially as described.

In testimony whereof we have hereunto set our hands.

WILHELM BAUER.
ALFRED HERRE.